Oct. 24, 1967          G. L. DIGHTON            3,349,154
             DECREASED BLOCK IN POLYMER FILMS
                   Filed May 27, 1964
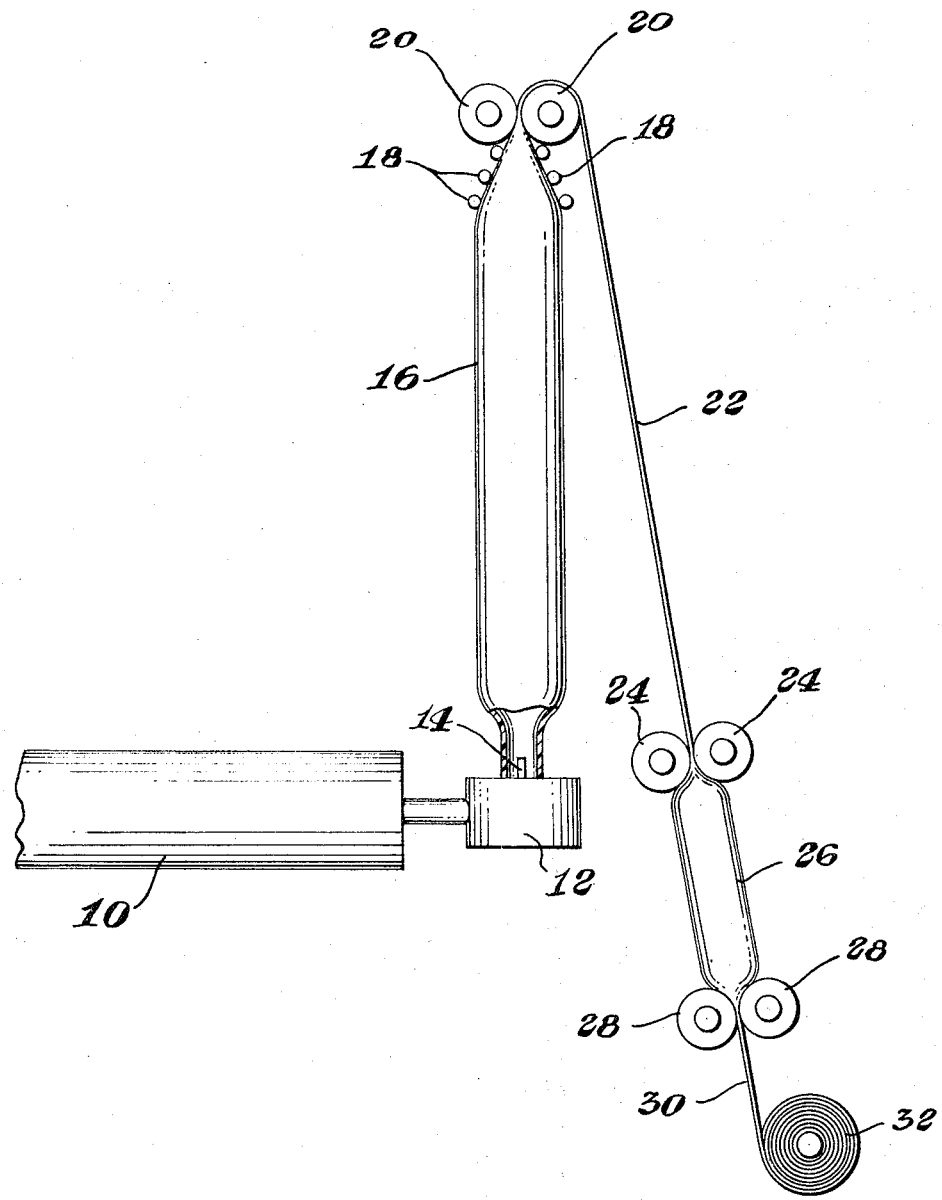
INVENTOR
Gaylon L. Dighton
BY
Jerome Rudy
ATTORNEY /# 3,349,154
DECREASED BLOCK IN POLYMER FILMS
Gaylon L. Dighton, Lake Jackson, Tex., assignor to The Dow Chemical Company, Midland, Mich., a corporation of Delaware
Filed May 27, 1964, Ser. No. 370,474
1 Claim. (Cl. 264—89)

This invention relates to improved block in polymer films. More particularly, it relates to a method for producing non-blocking polymer films without the use of added anti-block agents.

Various methods of preventing block in polymer films are known in the art. Methods such as using slip sheets of various compositions between the film layers, separation of the films by various types of liquids and separation by means of finely divided solid particles have been employed; however, all have proven to be unsatisfactory due to time-consuming operations or undesirable film surface properties.

Other methods employ chemicals which are mixed into the polymer itself. Such additives "bleed" to the surface of the film and are thereby distributed along the surface of the film to prevent blocking. In many instances, the use of such anti-block agents has proven unsatisfactory, due to the presence of material on the surface of the films which tends to interfere with the adhesion of printing ink. It would, therefore, be highly desirable to provide a method for reducing block in polymer films which eliminates the need for addition or use of anti-block agents.

It is an object of the present invention to provide a method for producing films having reduced tendencies toward blocking. It is a further object to provide a method for producing polymer films with reduced block, which method does not require the use of anti-block agents. A more specific object is to provide a method for producing polymer films with reduced block, wherein said method comprises twice inflating and collapsing an extruded polymer tubing. Other objects, advantages, features and variations will become apparent from the following description.

In accordance with the present invention, the above and other objects are attained by extruding a thermoplastic material in a formative plastic state through an annular die to form a seamless tubing, inflating said tubing with a gaseous inflating agent to form a plastic bubble, cooling and collapsing the bubble by constricting means thereby confining a body of a gaseous inflating agent within the bubble, inflating the collapsed tubing a second time with gaseous inflating agent, collapsing said second bubble by constricting means and thereafter collecting the lay-flat tubing.

The term "formative plastic state" is used herein to define that state of the plastic wherein the plastic is in the unset or partly set condition and can be enlarged as by stretching by injecting a gaseous inflating agent into the interior of the tubing.

Reference is made to the accompanying drawing from which the process of the present invention is described.

The figure of the drawing is a diagrammatic side elevation (with the extruder in partial section) of an apparatus wherein the process of the present invention is accomplished.

Referring to the drawing, the polymer is fed into extruder 10 and heated by conventional means (not shown) to a formative plastic state. The resulting molten polymer is passed through the extruder by conventional means (not shown) and forced through die 12, said die provided with an annular orifice (not shown). The molten mass emerges from the orifice as a viscous thermoplastic tubing. The die is provided with a central orifice 14 which is connected to a supply of gaseous inflating agent, said inflating agent being introduced interiorly of the tubing to inflate the same.

The inflated tubing 16 is drawn upwardly toward and by means of driven nip rolls 20 through collapsing means such as converging rollers 18 which collapse tube 16 prior to entering nip rolls 20. The plastic bubble 16 is cooled from the formative plastic state of extrusion at the die 12 to a set and hardened state at the collapsing means 18 by natural radiation heat loss or by supplemental cooling means not shown. The collapsed tubing 22 is drawn through nip rolls 24, over a trapped gas bubble 26, and through motor-driven nip rolls 28. The second gas bubble 26 is initially formed in the plastic tubing between nip rolls 24 and 28 by inserting a hollow needle, connected to a supply of gaseous inflating agent, into the tubing and inflating the same. The inflated tubing is collapsed by means of nip rollers 28 and the resulting lay-flat tubing 30 is wound up and collected on roller 32.

The following example is illustrative of the invention and is not intended to limit the scope thereof.

Example

A molten terpolymer of ethylene, vinyl acetate and propylene was extruded in an apparatus of the type shown in the drawing at the rate of 21 pounds per hour through a 4-inch die having an annular orifice of 0.012 inch, the temperature of the extruded polymer being about 325° F. The extruded tubing was withdrawn upwardly in a vertical direction from the die at a rate of 26 feet per minute by the nip rolls 20 positioned 6 feet above the die. Air was introduced through the inlet 14 to inflate the tubing, while in a plastic formative state, to a final diameter of seven inches. When sufficient air had been introduced, the air supply was shut off entrapping the air bubble between the top of the die 12 and nip rolls 20. The inflated plastic bubble was collapsed by means of nip rolls 20 and subsequently passed through nip rolls 24 located about eight feet from nip rolls 20.

A hollow needle connected to an air supply was inserted into the collapsed tubing between nip rolls 24 and 28 thereby inflating the tubing to form a second bubble 26, said bubble being formed at about room temperature. The bubble was collapsed by means of nip rolls 28 and the lay-flat tubing 30 was wound up on roll 32.

A sample of film produced by the above-described process was tested for blocking properties. The results showed the film to have a blocking value of 5.

The terpolymer of ethylene, vinyl acetate and propylene was also made into film by a blown bubble process employing only a single bubble. The blocking value of a film sample prepared by this method was found to be about 53, a blocking value at least ten times greater than that obtained for films produced by the process of the present invention.

The block test is carried out and the blocking value is determined as follows: Two film holders, each having a square flat surface of 14 square inches covered with a sample of the film to be tested for blocking, are placed together with the test films in full contact in a horizontal plane but without pressure. The lower film holder is held fixedly while the upper film holder is suspended from one end of the beam of a beam balance and counterpoised so that there is zero force between the film holders. The arrangement is such that weights applied to the balance beam exert a force tending to separate the film holders along a line normal to the contacting surfaces of the test film. The force in grams necessary to separate the film surfaces from contact with each other is taken as a measure of blocking, such force being proportionate to the tendency of the films to block.

What is claimed is:

A method for producing a non-blocking polymer film which consists essentially of extruding a thermoplastic material in a formative plastic state through an annular die orifice to form a seamless tubing; inflating said tubing with a gaseous inflating agent; cooling and collapsing the inflated tubing by constricting means thereby confining a bubble of gaseous inflating medium within the tubing; inflating the collapsed tubing a second time at room temperature with a gaseous inflating agent forming a second trapped gas bubble; collapsing the inflated tubing by constricting means and collecting the flattened tubing.

References Cited

UNITED STATES PATENTS

| 2,476,140 | 7/1949 | Francis | 264—95 |
| 2,634,459 | 4/1953 | Irons | 264—95 X |
| 2,916,764 | 12/1959 | Gerber | 18—14 X |
| 3,022,543 | 2/1962 | Baird | 264—209 X |

FOREIGN PATENTS

| 1,274,521 | 9/1961 | France. |
| 1,355,708 | 2/1964 | France. |

ROBERT F. WHITE, *Primary Examiner.*

L. S. SQUIRES, A. R. NOE, *Assistant Examiners.*